US009215606B2

(12) United States Patent
Blicker

(10) Patent No.: US 9,215,606 B2
(45) Date of Patent: Dec. 15, 2015

(54) TRANSMISSION OF CONTENT-RELATED DATA OF AN OTT PROVIDER TO A TELECOMMUNICATIONS DEVICE USING A TELECOMMUNICATIONS NETWORK

(71) Applicant: Deutsche Telekom AG, Bonn (DE)

(72) Inventor: Stephan Blicker, Wachtberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/283,244

(22) Filed: May 21, 2014

(65) Prior Publication Data

US 2014/0347991 A1    Nov. 27, 2014

(30) Foreign Application Priority Data

May 23, 2013   (DE) .......................... 10 2013 008 733

(51) Int. Cl.
*H04L 12/50*   (2006.01)
*H04W 24/02*   (2009.01)
*H04W 4/18*   (2009.01)

(52) U.S. Cl.
CPC ................ *H04W 24/02* (2013.01); *H04W 4/18* (2013.01)

(58) Field of Classification Search
CPC ......... H04L 2012/5608; H04W 84/12; H04W 88/08; H04W 80/04; H04W 88/06; H04W 84/18; H04W 74/08
USPC ............................... 370/310.2, 328, 338, 349
See application file for complete search history.

(56) References Cited

U.S. PATENT DOCUMENTS

| 6,725,460 B1 * | 4/2004 | Nishiyama et al. ............. 725/32 |
| 2003/0045273 A1 | 3/2003 | Pyhalammi et al. |
| 2011/0055413 A1 | 3/2011 | Lobsenz |
| 2013/0254815 A1 * | 9/2013 | Pfeffer et al. .................... 725/96 |

FOREIGN PATENT DOCUMENTS

WO    WO 2011009578 A1    1/2011

* cited by examiner

*Primary Examiner* — Brenda H Pham
(74) *Attorney, Agent, or Firm* — Leydig, Voit & Mayer, Ltd.

(57) ABSTRACT

A method is provided for transfer of content-related data of an Over-the-top (OTT) provider to a telecommunications device using a telecommunications network. The method includes: receiving, by the OTT provider, a request for content-related data; transmitting the content-related data of the OTT provider to a content delivery interface device of the telecommunications network; and transmitting the content-related data of the OTT provider to a content delivery functionality of the telecommunications network and transmitting the content-related data of the OTT provider from the content delivery functionality of the telecommunications network to the telecommunications device at a predetermined time or in a predetermined time interval. The telecommunications network includes a radio interface and a further radio interface for transmission of the content-related data of the OTT.

8 Claims, 1 Drawing Sheet

10 base station
19 first domain
20 telecommunications device
30 content delivery interface device
31 first OTT provider
32 second OTT provider
33 third OTT provider
35 internet / content delivery functionality
39 second domain
50 backbone or central network
51 network monitoring system
52 content control functionality
53 HSS / user database
100 telecommunications network

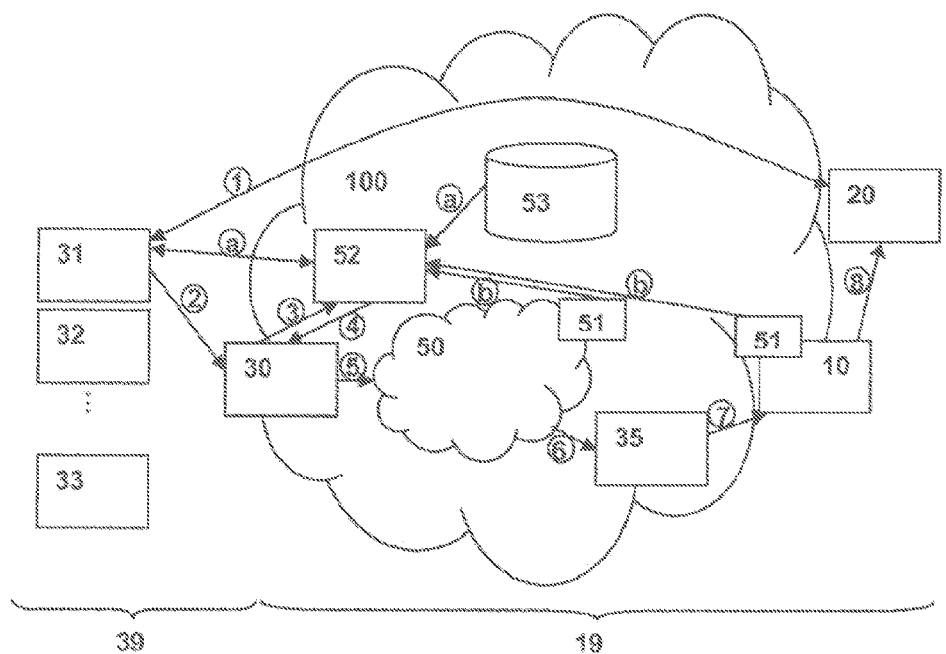
10 base station
19 first domain
20 telecommunications device
30 content delivery interface device
31 first OTT provider
32 second OTT provider
33 third OTT provider
35 Internet / content delivery functionality
39 second domain
50 backbone or central network
51 network monitoring system
52 content control functionality
53 HSS / user database
100 telecommunications network

TRANSMISSION OF CONTENT-RELATED DATA OF AN OTT PROVIDER TO A TELECOMMUNICATIONS DEVICE USING A TELECOMMUNICATIONS NETWORK

CROSS-REFERENCE TO RELATED APPLICATIONS

Priority is claimed to German Patent Application No. DE 10 2013 008 733.3, filed on May 23, 2013, the entire disclosure of which is hereby incorporated by reference herein.

FIELD

The invention relates to a method for transmission of content-related data of an OTT provider (Over-the-top provider) to a telecommunications device using a telecommunications network, wherein the content-related data are transmitted via a radio interface of the telecommunications network and a further radio interface of the telecommunications device.

The invention further relates to a system, comprising a telecommunications terminal device, an OTT provider, and a telecommunications network, for transmission of content-related data of the OTT provider to the telecommunications terminal device using the telecommunications network, wherein the telecommunications network has a radio interface, wherein the telecommunications device has a further radio interface, wherein the telecommunications network and the telecommunications device are provided for transmission of the content-related data via the radio interface and the further radio interface.

Furthermore, the invention also relates to a telecommunications network for transmission of content-related data an OTT provider to the telecommunications device.

BACKGROUND

Current mobile radio networks of the third and fourth generation are already being offered to customers today and probably still more in the future as part or complete replacements for the landline network, i.e. there is an access device—typically in the home or on the customer's premises—for example, a router, to supply devices through wireless and/or wired connections, for example musical systems, video players etc., where the access device is connected only partially or even not at all to a telecommunications network via a landline (typically based on a DSL connection; Digital Subscriber Line), but via a mobile radio connection. The partial connection of the access device by a landline connection means that the landline connection is available and in addition a mobile radio connection of the access device also exists, so that potentially, and depending on the situation, data interchange is possible solely through one of these connection channels or via both of these channels (so-called 'hybrid access', in which the connection is provided via DSL and via LTE in combination, for example). It should therefore be anticipated that high volumes of data must be expected in both the mobile radio transport networks and the radio interface of the mobile radio networks. These are linked to high levels of capital investment by the mobile radio operators.

So-called OTT providers (Over-the-top providers) already provide Internet content and content-related data (with large volumes of data) intended for distribution over the DSL network, which the customer can download himself, subject to payment. In the mobile radio networks of the future (particularly the mobile radio networks of the third and fourth generation, such as LTE; Long Time Evolution), the customer, who elects for 3G or LTE technology as partial or complete replacement for landline, on the basis of the high volume of data for these content-related data (in particular when downloading) must take account of restrictions relating to his or her tariff, for example ones that reduce the available transmission bandwidth (for instance after use of a certain volume of data in a specific time period), also called 'speed step-down'. This represents a restriction of both the OTT provider and the end customer.

A method is described in document WO 2011/009578 A1 for enhanced communication efficiency, whereby the communication is modified on the radio interface between a base station of the mobile radio network and a mobile device in that a control message is transmitted from the base station to the mobile device, wherein the control message comprises a modification information, wherein the modification information refers to modified transmission conditions within a specific time interval—in particular for transmission of the non-real-time data.

The transmission of data via the radio interface of the mobile radio communication network or the telecommunications network is dependent on the reaction of the mobile devices or telecommunications terminal devices or telecommunications devices, however. This means that situations can occur in which a preferred transmission possibility is communicated on the part of the telecommunications network or the mobile radio communications network but is not used, however, leading ultimately to a momentary smaller and thus more uneven—and thus less favorable—capacity utilization of the telecommunications network.

SUMMARY

In an embodiment, the invention provides a method for transfer of content-related data of an Over-the-top (OTT) provider to a telecommunications device using a telecommunications network. The method includes: receiving, by the OTT provider, a request for content-related data; transmitting the content-related data of the OTT provider to a content delivery interface device of the telecommunications network; and transmitting the content-related data of the OTT provider to a content delivery functionality of the telecommunications network and transmitting the content-related data of the OTT provider from the content delivery functionality of the telecommunications network to the telecommunications device at a predetermined time or in a predetermined time interval. The telecommunications network includes a radio interface and a further radio interface for transmission of the content-related data of the OTT.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a schematic view of an example of a system in accordance with an embodiment of the invention, comprising a telecommunications network, a telecommunications device, and a plurality of OTT providers.

DETAILED DESCRIPTION

In an embodiment, the invention provides a method for transmission of content-related data of an OTT provider to a telecommunications device via a radio interface which, at low cost and with the smallest possible adverse effect on the user, enables the utilization of the capacity of the telecommunications network to be optimized—in particular the utilization of purely internal or essential internal communications routes of the telecommunications network and/or the utilization of the radio interface of the telecommunications network.

The invention provides a method for transmission of content-related data of an OTT-provider (Over-the-top provider) to a telecommunications device using a telecommunications network, wherein the content-related data are transmitted via a radio interface of the telecommunications network and a further radio interface of the telecommunications device, wherein the telecommunications network has a content delivery interface device for connection of the OTT provider, wherein the telecommunications network has a content delivery functionality for transmission of the content-related data via the radio interface and the further radio interface to the telecommunication device, wherein the method has the following steps:

in a first method step, the OTT provider receives a request for content-related data, in a second method step following the first method step, the content-related data of the OTT provider are transmitted to the content delivery interface device of the telecommunications network, in a third method step following the second method step, the content-related data transmitted in the second method step to the content delivery interface device of the telecommunications network are transmitted to the content delivery functionality of the telecommunications network and from the content delivery functionality of the telecommunications network at a predetermined time or in a predetermined time interval to the telecommunications device.

By using such a method in accordance with the invention, for network-protecting delivery of contents with high data volumes—in particular content-related data—the available capacity of the radio interface and/or of purely internal or essentially internal communications routes of the telecommunications network is used better or more efficiently in low-traffic periods, so that the content-related data can be delivered precisely at this time.

According to the invention, it is advantageously possible that the costs of inputting the content-related data of the OTT provider are relatively small for the network operator of the telecommunications network, because the additional utilization of the telecommunications network is comparatively small (because the transmission of the content-related data typically takes place during low-traffic periods, namely at a predetermined time or in a predetermined time interval) in spite of the possibly substantial volume of data of the content-related data, or the transmission of the content-related data of the OTT provider does not require additional capacity of the telecommunications network. In particular, very flexible and/or very favorable price scenarios are conceivable, for example 'pay per use' and/or a monthly and/or volume-dependent price for the transmission of content-related data (supplied by the OTT provider) to the telecommunications device. Moreover, it is conceivable that tariff restrictions (e.g. speed step-down) can be dispensed with, in particular as regards the final customer, within the scope of such flexible and all favorable price scenarios. Thus, with this restriction—that the content-related data are transmitted (by the telecommunications network or by the operator of the telecommunications network) at the predetermined time or the predetermined time interval—the associated transmission of the content-related data can be undertaken for the customers of the telecommunications network or the OTT provider at comparatively favorable cost. The final customer cannot use the contents immediately in all cases (in particular to see a video or to use software content) but only after delivery by the network operator at the predetermined time or in the predetermined time interval, typically in the low-traffic period. However, this is not critical for most 'non-real-time data' or non-real-time applications.

The predetermined time or the predetermined time interval for transmission of the content-related data from the content delivery functionality to the telecommunications device, according to the invention, is strictly defined, for example according to a variant (for example for a first OTT provider—e.g., in the range of a radio cell of the mobile radio communications network or in the range of several radio cells of the mobile radio communications network or the telecommunications network—from 1 a.m. to 1.30 a.m., for a second OTT provider from 1.30 a.m. to 2 a.m., etc.)—or else, according to a further variant, defined variably, i.e. predetermined time or predetermined time interval is transmitted to the content delivery interface facility and/or the content delivery functionality, for example via a message.

For example, the predetermined interval for carrying out the third method step corresponds to approx. 300 seconds or approx. 600 seconds or approx. 1200 seconds or approx. 1800 seconds or approx. 45 minutes or approx. 60 minutes or approx. 120 minutes or approx. 180 minutes. As an alternative to a predetermined successive transmission of the content-related data by various OTT providers or else for different telecommunications devices (within a radio cell or within a geographic area with competitive usage of the radio resources of the telecommunications network) it can also be provided, in accordance with the invention, that different time slots are provided for the different content-related data (from the various OTT providers and/or for the different telecommunications devices), where the time slots are repeated according to a predetermined or predefined pattern.

According to the invention, content-related data involve in particular non-real-time data, i.e. that data that does not have to be transmitted urgently within an especially short transmission time. Examples of this are, for instance, email messages (or messages of another type such as, for instance, MMS (Multimedia Message System) messages, etc.), non-real-time video data, for example that for VOD (Video-on-Demand) applications or software data, i.e. data through which software elements (of individual software modules up to complete programs or operating systems or the like) are transmitted. In contrast, real-time data relates to those communication connections for which a very rapid transmission is therefore necessary, because a direct reaction is essentially required from a communication partner, e.g., for the transmission of telephone calls, of video telephone conversations or for the transmission of data relating to Internet applications, possibly real-time data for a traffic-related and/or router-related Internet application of a user of the telecommunications device.

According to the invention (and for all variants of the invention and both for the method according to the invention and the system according to the invention, the telecommunications network according to the invention and the telecommunications device according to the invention) the telecommunications device is, for example, a fixed (i.e. a 'non-mobile' or typically infrequently moved) device or e.g., a ('mobile') a communications terminal device, for example a telephone or a portable computer. In the case of a fixed telecommunications device, it can be, for example, an access device for provision of Internet connectivity, e.g., in an apartment or house or e.g., a so-called set-top box with Internet connectivity, e.g., for direct or indirect connection to a television set or other play-back device for audio-visual or multimedia data.

According to the invention, there is a preferred provision—corresponding to the further variant already mentioned—for information to be transmitted
at the predetermined time of which the third method step begins and/or
over the predetermined time interval for execution of the method third step, to the content delivery interface device and/or the content delivery functionality.

According to the invention, it is thereby advantageously possible for the content delivery from the content delivery interface facility to the content delivery functionality and on to the telecommunications device to take place in a controlled manner; in particular it is possible, according to the invention for an individual user's information and/or that of an OTT provider-information to be transmitted via the predetermined time of starting for execution of the third method step and/or via the predetermined time interval for execution of the third method step to the content delivery interface device, so that the transmission of the content-related data to the content delivery functionality and on to telecommunications device can take place using the resources of the telecommunications network efficiently and particularly moreover with transmission in a timely manner (in relation, e.g., to the time of placing the order) of the content-related data and in the smallest time period possible (in relation to the time interval required for transmission of the content-related data).

Without the transmission of information, via the predetermined time when the third method step begins and/or via the predetermined time interval of execution of the third method step, to the content delivery interface device—corresponding to the mentioned (first) variant—it can also be provided, according to an alternative embodiment of the method in accordance with the invention or according to an alternative embodiment of the system in accordance with the invention or the telecommunications network or telecommunications device in accordance with the invention, that for example fixed predetermined times and/or time intervals are provided during the low-traffic periods (typically during the night) for the transmission of the content-related data, for example for a first OTT provider (in the area of a radio cell of the mobile radio communications network or in the area of several radio cells of the mobile radio communications network or the telecommunications network) from 1 a.m. to 1:30 a.m., for a second OTT provider from 1:30 a.m. to 2:00 a.m., etc.

According to the invention it is further preferably provided that the telecommunications network has a content control functionality, wherein the information is transmitted via the predetermined time or the predetermined time interval of the content delivery interface device by the content control functionality.

Because of this, it is advantageously possible, according to the invention, that a central entity within the telecommunications network efficiently undertakes the control of the transmission of the content-related data, so that the normal operation of the telecommunications network for real-time applications, i.e. in particular voice radio applications, video radio applications and/or real-time or near real-time Internet applications is not affected or at least not substantially affected.

Further, it is preferable according to the present invention that the telecommunications network has a network monitoring system, wherein the predetermined time or the predetermined time interval take place depending on information transmitted by the network monitoring system to the content control functionality, in particular on the current capacity utilization of at least a part of the telecommunications network.

Because of this, it is advantageously provided in accordance with the invention that the information transmitted by the content control functionality to the content delivery interface device is adapted in respect of the predetermined time and/or predetermined time interval for execution of the method third step to the current capacity situation of the telecommunications network.

According to the invention, it is further also preferred that the content-related data are non-real-time data, wherein the telecommunications device is either activated or previously activated to receive the content-related data at the predetermined time or during the predetermined time interval, in particular by the telecommunications network and is activated automatically.

Because of this, at the predetermined time and/or in the predetermined time interval, it is feasible that the telecommunications device is also in a position to receive content-related data, i.e. is appropriately activated to receive (i.e. in particular, is not in an energy-saving mode with reduced readiness to receive).

Further, it is preferably provided according to the invention that, during the first method step, the request transmitted to the OTT provider for content-related data is transmitted by the telecommunications device to the OTT provider.

Because of this, it is particularly simple according to the invention to define the content-related data by way of the telecommunications device.

According to the invention, it is further also preferred that, in the first part of the third method step, the content-related data are transmitted from the content delivery interface device to the content delivery functionality and, in a second part following the first part of the third method step, from the content delivery functionality of the telecommunications network to the telecommunications device.

According to the invention, it is further preferred that the content-related related data are temporarily stored by the content delivery functionality after receipt from the content delivery interface device.

Because of this, it is advantageously possible, according to the invention, to achieve a higher flexibility in the transmission of the content-related data and further a decoupling of transmission between the content delivery interface device and the content delivery functionality, on the one hand, and the transmission between the content delivery functionality and the telecommunications device on the other hand. The content delivery functionality, according to the invention, is optimized for delivery of the content-related data via the mobile radio network or the mobile radio network part of the telecommunications network and, in particular, is in a position to modify the content-related data and the transmission parameters and is the central starting point for the telecommunications device (or so-called client), in particular using a previously agreed or defined Internet protocol address or using a resolvable DNS address (Domain Name System address). Further, by temporary storage of the content-related data in the content delivery functionality, it is also possible to download the content or the content-related data repeatedly without the telecommunications network being re-loaded between the content delivery interface device and the content delivery functionality (also known as 'IP network backbone').

A further embodiment of the present invention provides a system, comprising a telecommunications terminal device, an OTT provider (Over-the-top provider) and a telecommunications network, for transmission of content-related data of an OTT provider to the telecommunications device using the telecommunications network, wherein the telecommunications network has a radio interface, wherein the telecommunications device has a further radio interface, wherein the telecommunications network and the telecommunications device are provided for transmission of the content-related data via the radio interface and the further radio interface, wherein the telecommunications network has a content delivery interface device for connection of the OTT provider, wherein the telecommunications network has a content delivery functionality for transmission of content-related data via the radio interface and a further radio interface to the telecommunications device, wherein the telecommunications network further has a content control functionality, wherein the OTT provider is configured to receive a request for content-related data, wherein the OTT provider and the telecommunications network are configured so that the content-related data of the OTT provider are transmitted depending on the request for contact-related data to the content delivery interface device of the telephone communications network, wherein the telecommunications network is configured so that the content-related data transmitted to the content delivery interface device are transmitted to the contact delivery functionality of the telecommunications network and from the content delivery functionality of the telecommunications network to the telecommunications device at the predetermined time or in a predetermined time interval.

With such a system in accordance with the invention (or telecommunications network with an OTT provider and a telecommunications device), it is advantageously possible, in relation to the conventional telephone communications networks, for low-traffic periods also to be used for transmission of content-related data, so that a more optimized customer service can be implemented at comparatively low cost.

All preferred embodiments which have been disclosed in accordance with the method of the invention also relate to the system according to the invention; in particular that information is transmitted, via the predetermined time for beginning the execution of the third method step and/or via the predetermined time interval for execution of the third method step, to the content delivery interface device and/or to the content delivery functionality, or the system or the telecommunications network is appropriately configured;

the telecommunications network has a content control functionality, wherein the information is transmitted via the predetermined time or the predetermined time interval to the content delivery interface device by the content control functionality or the telecommunications network is appropriately configured;

the telecommunications network has a network monitoring system, wherein the predetermined time or the predetermined time interval take place depending on the information transmitted by the network monitoring system to the content control functionality in particular via the current capacity utilization of at least a part of the telecommunications network, or the system or the telecommunications network is appropriately configured;

the content-related data are non-real-time time data, whereby the telecommunications device is either activated or previously activated to receive the content-related data at the predetermined time or during the predetermined time interval;

the request transmitted during the first method step to the OTT provider for content-related data is transmitted from the telecommunications device to the OTT provider;

the content-related data are temporarily stored by the content delivery functionality after receipt from the content delivery interface device or the telecommunications network is appropriately configured.

Further, the present invention also relates to a telecommunications device for use in a system in accordance with the invention, wherein the telecommunications device is configured so that the telecommunications device can be activated automatically to receive the content-related data at the predetermined time or the predetermined time.

The present invention also further relates to a telecommunications network for transmission of content-related data of an OTT provider (Over-the-top provider) to a telecommunications device, wherein the telecommunications network has a content delivery interface device for connection of the OTT provider, wherein the telecommunications network has a content delivery functionality for transmission of the content-related data via a radio interface of the telecommunications network, wherein the telecommunications network further has a content control functionality, wherein the telecommunications network is configured so that the content-related data are received at the content delivery interface device of the telecommunications network, wherein the telecommunications network is configured so that the content-related data transmitted to the content delivery interface device are transmitted to the content delivery functionality of the telecommunications network and from the content delivery functionality of the telecommunications network at the predetermined time or in the predetermined time interval to the radio interface of the telecommunications network.

With such a telecommunications network according to the invention it is advantageously possible in relation to conventional telecommunications networks for low-traffic periods to be used for transmission of content-related data.

All preferred embodiments which have been disclosed in accordance with the method of the invention also relate to the telecommunications network in accordance with the invention, in particular that information is transmitted on the predetermined time for beginning of execution of the third method step and/or on the predetermined time interval for execution of the third method step, to the content delivery interface device and/or the content delivery functionality or the telecommunications network is appropriately configured;

the telecommunications network has a content control functionality, wherein information is transmitted on the predetermined time or the predetermined time interval to the content delivery interface device from the content control functionality or the telecommunications network is appropriately configured;

the telecommunications network has a network monitoring system, wherein the predetermined time or the predetermined time interval takes place depending on the information transmitted by the network monitoring system to the content control functionality, in particular, in particular on the current capacity utilization of at least a part of the telecommunications network, or the telecommunications network is appropriately configured;

the content-related data are non-real-time time data, wherein the telecommunications device is either activated or previously activated for receiving the content-related data at the predetermined time or during the predetermined time interval;

the request transmitted to the OTT provider for content-related data is transmitted from the telecommunications device to the OTT provider;

the content-related data are temporarily stored by the content delivery functionality after receipt from the content delivery interface device, or the telecommunications network is appropriately configured.

Further, the present invention also relates to a computer program with program code, with the aid of which all steps of the method according to the invention can be carried out, when the computer program is run on a network unit or a plurality of network units of a telecommunications network, a computer, or a corresponding processing unit.

An embodiment of the present invention also provides a computer program product with a computer-readable medium and a computer program with program code means stored on a computer-readable medium, which are suitable for all steps of the method according to the invention to be carried out, when the computer program is run on a network unit or a plurality of network units of a telecommunications network, a computer, or a corresponding processing unit.

Further details, features and advantages of the invention arise from the drawings, as well as from the following description of preferred embodiments, with the aid of the drawings. The drawings only illustrate embodiments of the invention as examples which do not limit the essential concepts of the invention

DETAILED DESCRIPTION

FIG. 1 is a schematic view of an example of a system according to the invention, comprising a telecommunications network 100 according to the invention, a telecommunications device 20 according to the invention and a plurality of OTT providers (Over-the-top providers), wherein the system according to the invention is designed for carrying out the method according to the invention. A first OTT provider is identified with the reference 31. A second OTT provider is identified with the reference 32. A third OTT provider is identified with the reference 33.

The telecommunications network 100—which is schematically represented in the form of a large cloud—has a content delivery interface device 30 (also termed content delivery gateway function) for connecting the OTT providers 31, 32, 33. However, for simplicity only the connection for the first OTT provider 31 to the telecommunications network 100 is shown; i.e. the content delivery interface device 30 is in practice also connected to the second OTT provider 32 and to the third OTT provider 33. It is clear that the first, second and third OTT providers 31, 32, 33 stand for any desired number of OTT providers. The content delivery interface device acts as the connecting link between a first domain 19 of the telecommunications network 100 (or the operator of the telecommunications network 100) and a second domain 39 of the OTT provider 31, 32, 33 or a plurality of OTT providers 31, 32, 33. It can also be provided here that a separate content delivery interface device is provided per OTT provider 31, 32, 33, connected to the telecommunications network 100, but is not shown in FIG. 1, however.

The telecommunications network 100 has a backbone network 50 or a central network 50, which is also described as 'Operator Backbone Internet Protocol network'. The telecommunications network 100 further has an Internet delivery functionality 35, which is connected to a base station 10 of the telecommunications network 100 as an example for a plurality of base station or base station units of the telecommunications network 100. The content delivery functionality 35 is connected via the central network 50 to the content delivery interface device 30. A radio interface of the telecommunications network 100 is available to the base station and is in radio contact with a further radio interface of the telecommunications device. The telecommunications device 20 represents all embodiments of the invention and both for the method according to the invention and for the system according to the invention, the telecommunications network 100 according to the invention or the telecommunications device 20 according to the invention, for example a fixed device or a ('mobile') telecommunications device, in particular a telecommunications terminal device, for example a telephone or a portable computer. A fixed telecommunications device 20 is, for example, an access device for provision of Internet connectivity or a so-called set-top box.

The telecommunications network 100 furthermore has a content control functionality 52 (called content policy and rules function in the following), wherein the content control functionality 52 controls the transmission of the content-related data from the content delivery interface device 30 to the telecommunications device 20 or to the content delivery functionality 35. In particular, it is provided according to the invention that the information on the predetermined time or the predetermined time interval is delivered to the content delivery interface device 30 by the content control functionality 52.

The telecommunications network 100 further also has
a home subscriber server 53 (HSS) for a user database 53, in which a user profiles are stored or are stored in the customer relationship data, in particular for performing a customer relationship management function); and
a network monitoring system 51, wherein the network monitoring system 51 is provided for acquisition of information on the current capacity utilization of the telecommunications network 100, wherein part components of the network monitoring system 51 (for example in the type of detectors of the degree of capacity utilization of the respective network components) are typically provided at various points in the telecommunications network 100—for example, in FIG. 1 this is shown as component 51 of the network monitoring system that the central network 50 and as component 51 of the network monitoring system at the base station 10—and wherein, according to the invention, in particular the predetermined time or the predetermined time interval (for the transmission of the content-related data in a third method step) takes place depending on information transmitted by the network monitoring system 51 to the content control functionality 52, in particular by the content control functionality 52.

According to the invention, it is provided that in the first method step the OTT provider 31, 32, 33 receives a request for content-related data—in particular from the telecommunications device 20 (see the arrow with the reference symbol 1 in FIG. 1). This request contains the message to transmit, for example, a specific video content, for example a film, to the telecommunications device 20 (in particular using a data compression procedure, such as a variant of the MPEG standard or similar). In a second method step following the first, the content-related data of the OTT provider 31, 32, 33 are transmitted to the content delivery interface device 30 of the telecommunications network 100 (see the arrow with the reference 2 in FIG. 1). In a third method step following the second method step, the content-related data transmitted in the second method step to the content delivery interface device 30 are transmitted to the content delivery functionality 35 of the telecommunications network 100 (see arrows 5 and 6 in FIG. 1) and from the content delivery functionality 35 of the telecommunications network 100 at a predetermined time or in a predetermined time interval to the telecommunications device 20 (see arrows 7 and 8 in FIG. 1). For determination of the predetermined time or the predetermined time interval or for transmission to the content delivery interface device 30, it is provided that a communication or an exchange of messages takes place between the content delivery interface device 30 and the content control functionality 52 (see arrows 3 and 4 in FIG. 1). Here information on the extent and/or the urgency of the content-related data requested by the telecommunications device 20 is transmitted in particular from the content delivery interface device 30 to the content control functionality 52 (see arrow 3) and the response in the form of information on the predetermined time or the predetermined time interval is transmitted from the content control functionality 52 to the content delivery interface device 30 (see arrow 4).

According to the invention, it is particularly provided that that network operator of the telecommunications network 100 has a special agreement with the OTT provider 31, 32, 33 or the OTT providers 31, 32, 33, in particular on the framework conditions for delivery of content-related data. The customer or final customer has a special client (for example a special application software or a so-called app loaded on his mobile or non-mobile telecommunications device 20 (or set-top box or a router device or laptop or the similar). The special client on the telecommunications device 20 (and thus the telecommunications device) is in a position to respond in various operating conditions with reduced energy usage (so-called standby modes) or to manage and carry out the command to make a connection at a specific time. The customer or final user is responsible for the special client also running on the telecommunications device 20 and is informed in particular (for example via the application or the client) on the anticipated loading time when purchasing the content or the content-related data. The customer requests the contents or the content-related data from the OTT provider 31, 32, 33. Because of the interfaces (indicated in FIG. 1 with an arrow and with the reference symbol a), it is ensured that both the operator or operator of the telecommunications network 100 and also the OTT provider 31, 32, 33 are aware of the respective customer relationships and the necessary identification information that is required (for example the MSISDN, a username or password (username/password match), etc.). In addition, when purchasing the content-related data, the customer or end user is notified of the anticipated delivery time/download time.

The OTT provider 31, 32, 33 supplies the content i.e. the content-related data, to the content delivery interface device 30 (or CDGWF; Content Delivery Gateway Function) (see arrow 2 in FIG. 1). The content delivery interface device 30 acts as input node for the OTT provider 31, 32, 33 for its contents (content-related data) and is in a position, to store contents temporarily and to transmit them at a later time via the operator IP backbone NW 50 (or central network 50).

The content delivery interface device 30 asks the content control functionality 52 (content policy and rules function, CPRF) when the contents are to be transmitted by the backbone, see arrow 3 in FIG. 1. The content control functionality 52 (or CPRF) calculates time with the aid of continuously transmitted information from the network monitoring system 51 of the IP backbone 50 and the mobile network (or base station 10 as representative of the mobile access network), see the arrows b in FIG. 1, which are to indicate capacity utilization information in relation to the respective network components. In addition the content delivery interface device 30 (or CDGWF), asks whether the customer (or telecommunications device 20) has a valid partnering tariff with the content provider or OTT provider 31, 32, 33, i.e. is entitled to receive transmitted content-related data.

The content control functionality 52 (or CPRF) notifies the content delivery interface device 30 (or CDGWF) of the delivery time, i.e. the predetermined time or the predetermined time interval for delivery or transmission of the content-related data to the telecommunications device 20 (see arrow 4 in FIG. 1).

The content delivery interface device 30 (or CDGWF) delivers the content at the time fixed to the content delivery functionality 35 (or Operator Content Delivery Network Function CDNF) (see arrows 5 and 6 in FIG. 1). The content-related data are also stored temporarily here. The repeated temporary storage increases the flexibility and the decoupling between transmission via the backbone (central network 50) and transmission via the mobile radio network. The content delivery functionality 35 (or CDNF) is optimized for delivery by the mobile radio network, can modify the content and the transmission parameters and is the central starting point for the client (via a previously agreed IP or resolvable DNS address), i.e. the application installed on the telecommunications device 20. The content or content-related data can also be downloaded repeatedly without placing a renewed load on the IP NW backbone 50.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for transfer of content-related data of an Over-the-top (OTT) provider to a telecommunications device using a telecommunications network, the method comprising:

transmitting, by a content control functionality device of the telecommunications network, information regarding a predetermined time or a predetermined time interval to a content delivery interface device of the telecommunications network;

receiving, by the OTT provider, a request for content-related data;

transmitting the content-related data of the OTT provider to the content delivery interface device of the telecommunications network; and transmitting the content-related data of the OTT provider to a content delivery functionality device of the telecommunications network and transmitting the content-related data of the OTT provider from the content delivery functionality device of the telecommunications network to the telecommunications device at the predetermined time or in the predetermined time interval;

wherein the telecommunications network includes a central network, a radio interface and a further radio interface for transmission of the content-related data of the OTT;

wherein the radio interface of the telecommunications network is a base station;

wherein the telecommunications network further includes a network monitoring system, wherein a first component of the network monitoring system is provided at the central network and a second component of the network monitoring system is provided at the base station;

wherein the predetermined time or the predetermined time interval is based on information relating to current capacity utilization transmitted from the first component of the network monitoring system and from the second component of the network monitoring system to the content control functionality device.

2. The method according to claim 1, wherein the content-related data of the OTT is non-real-time type data, and wherein the telecommunications device is configured to receive the content-related data at the predetermined time or in the predetermined time interval.

3. The method according to claim 1, wherein the request transmitted to the OTT provider is transmitted by the telecommunications device.

4. The method according to claim 1, wherein the content-related data of the OTT is transmitted by the content delivery interface device to the content delivery functionality device, and wherein the content-related data of the OTT is transmitted by the content delivery functionality device to the telecommunications device.

5. The method according to claim 1, wherein the content-related data of the OTT is temporarily stored by the content delivery functionality device after being received by the content delivery interface device.

6. A system for transmission of content-related data of an Over-the-top (OTT) provider to a telecommunications device using a telecommunications network, the system comprising:
   the telecommunications terminal device;
   the OTT provider; and
   the telecommunications network;
   wherein the telecommunications network comprises a central network;
   wherein the telecommunications network comprises a radio interface, wherein the radio interface of the telecommunications network is a base station;
   wherein the telecommunications device comprises a further radio interface;
   wherein the telecommunications network and telecommunications device are configured to transmit the content-related data via the radio interface and the further radio interface;
   wherein the telecommunications network comprises a content delivery interface device for connection of the OTT provider;
   wherein the telecommunications network comprises a content delivery functionality device for transmission of the content-related data via the radio interface and the further radio interface to the telecommunications device;
   wherein the telecommunications network further has a content control functionality device;
   wherein the OTT provider is configured to receive a request for the content-related data;
   wherein the OTT provider and the telecommunications network are configured such that the content-related data is transmitted according to the request to the content delivery interface device;
   wherein the telecommunications network is configured so that the content-related data transmitted to the content delivery interface device is transmitted to the content delivery functionality device and from the content delivery functionality device to the telecommunications device at a predetermined time or in a predetermined time interval;
   wherein the content control functionality device is configured to send information regarding the predetermined time or the predetermined time interval to the content delivery interface device;
   wherein the telecommunications network further includes a network monitoring system, wherein a first component of the network monitoring system is provided at the central network and a second component of the network monitoring system is provided at the base station;
   wherein the first component of the network monitoring system and the second component of the network monitoring system are configured to send information relating to current capacity utilization to the content control functionality device.

7. The system according to claim 6, wherein the telecommunications device is configured to be automatically activated to receive the content-related data at the predetermined time or in the predetermined time interval.

8. One or more non-transitory processor-readable media having processor-executable instructions stored thereon for transfer of content-related data of an Over-the-top (OTT) provider to a telecommunications device using a telecommunications network, the processor-executable instructions, when executed by a processor, facilitating the performance of the following steps:
   transmitting information relating to current capacity utilization from a first component of a network monitoring system and from a second component of a network monitoring system to a content control functionality device;
   transmitting, by the content control functionality device of the telecommunications network, information regarding a predetermined time or a predetermined time interval based on the information relating to current capacity utilization to a content delivery interface device of the telecommunications network;
   receiving, by the OTT provider, a request for content-related data at the OTT provider;
   transmitting the content-related data of the OTT provider to the content delivery interface device of the telecommunications network; and
   transmitting the content-related data of the OTT provider to the content delivery functionality device of the telecommunications network and transmitting the content-related data of the OTT provider from the content delivery functionality device of the telecommunications network to the telecommunications device at the predetermined time or in the predetermined time interval;
   wherein the telecommunications network includes a central network, a radio interface and a further radio interface for transmission of the content-related data of the OTT;
   wherein the radio interface of the telecommunications network is a base station;

wherein the telecommunications network further includes the network monitor system, wherein the first component of the network monitoring system is provided at the central network and the second component of the network monitoring system is provided at the base station.

* * * * *